Aug. 14, 1945.  P. SCHÜTTLER  2,382,748

NUT

Filed July 8, 1940

Inventor:
Paul Schüttler

Patented Aug. 14, 1945

2,382,748

UNITED STATES PATENT OFFICE 2,382,748

NUT

Paul Schüttler, Berlin-Charlottenburg, Germany; vested in the Alien Property Custodian Application July 8, 1940, Serial No. 344,390
In Germany August 2, 1939

6 Claims. (Cl. 85—32)

Recent experiments directed toward increasing the security of screw connections have shown that the distribution of stress on the individual screw threads of a nut is not uniform. In the bearing portion of a conventional nut, a very high stress is produced in the first screw threads which diminishes toward the screw threads remote from the bearing face. In a conventional nut about 60% of the load is carried by the first third of the screw threads counted from the bearing face of the nut, while the remainder is distributed on the remaining two-thirds of the screw threads, gradually diminishing toward the outer end of the nut.

In the accompanying drawing showing several illustrative embodiments of the invention, Figure 1 shows a conventional nut under load and its corresponding stress diagram.

The screw threads located near the bearing face of the nut are stressed most. The better these screw threads can adapt themselves to the stressing of the screw bolt, the better the screw threads remote from the bearing face of the nut can engage. Therefore, the more completely the entire axial length of the nut is utilized to bear the stresses exerted by the bolt, the more uniform will be the distribution of the stresses in the screw threads of the nut.

Balancing notches have been proposed for reducing the increasing stress of the screw threads near the bearing face of the nut and for reducing the danger of breakage, for which the increasing stress is critical, such notches being made in the bearing face of the nut and so arranged that the stress is distributed more uniformly over all of the screw threads of the nut than is the case with conventional nuts.

It has also been proposed to give a slight conicity to the screw threads near the bearing face of the nut, so that the depth of the bearing surfaces of the threads is gradually reduced toward the bearing face whereby their participation in the transmission of the forces exerted is correspondingly reduced. It is also known to alter the screw thread diameter and pitch and to employ nuts composed of several disks or a combination nut involving upper and lower separate parts. Solution of this problem has also been proposed by constructing the nut as a collar nut with a supporting ring. However, all of these and other expedients thus far adapted for deflecting the lines of force away from the screw threads near the bearing face to the threads remote from the bearing face of the nut, have resulted in spatial alteration in the building up of the nut, which usually involved substantial additional time-consuming and expensive manufacturing steps.

The present invention provides a novel and simple way of attaining a better distribution of stress on the individual screw threads of the nut, in which it is possible to maintain the spatial shape of the nut, so that it does not differ in appearance from nuts in common use.

Figure 1:
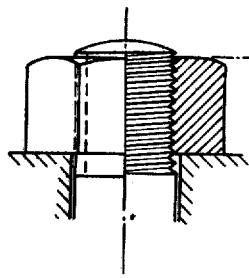
Figure 2:
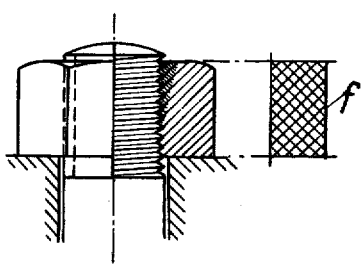
Figure 2 shows a nut according to the present invention, in which the density of the material is increased toward the outer end of the nut and its corresponding stress diagram.

In the stress diagrams in Figures 1 and 2, relating to conventional and to my improved nuts, respectively, the ordinates represent axial length through the nut from the base, and the corresponding abscissae of points along the curve $f$, represent relative load in the threaded section of the nuts at the point.

According to the present invention the material of the bore portion of the nut in which the screw threads are formed increases in strength from the working face of the nut toward the opposite end of the nut, and has a correspondingly increasing modulus of elasticity.

The desired alteration of the strength and elasticity can be provided, for instance in the cases of iron and steel nuts, by mechanical condensation, hardening, and the like of the bore portion of the nut or of the screw threads, by heat-, case-, or nitriding-treatment or similar processes. If, for instance, a light metal is used as the material of the nut, the desired change in the modulus of elasticity of the bore may be produced either by mechanical condensation of a portion of the nut bore or by partly hardening the bore by thermic means. Chemical means of altering the alloy of the metal at the desired area may also be employed.

Figure 3:
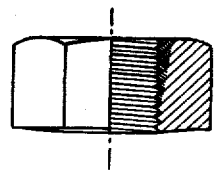
Figure 3 is a side elevation partly in section to show the wall of the threaded bore progressing in density toward the outer end of the nut and formed with a conical annular projection on the bearing face of the nut.
Figure 4:
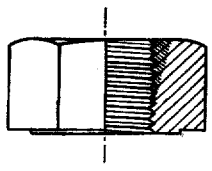
Figures 4 and 5 are similar views showing cylindrical and ball-shaped annular projections, respectively, on the bearing face of the nut.
Figure 5:
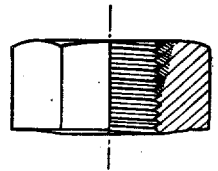

By means of the present invention there is attained, besides a desirable distribution of the stresses in the nut, a locking effect which secures the nut against unwanted loosening on its bolt. For enhancing this effect the working or bearing face of the nut is formed to project in a well-known manner near the screw threads of the bore, in either a conical, cylindrical, or ball shape, as shown in Figures 3, 4, and 5. As a result, whether the material of the nut was initially soft or hard and was subsequently either hardened or softened, respectively, to provide the desired modulus of elasticity in the region of the threaded bore, the working face of the nut and its projection will tend to be flattened out by the engagement of the working face of the nut against the work, in such manner that the screw thread clearance near the working face-equipped end of the nut is reduced so as to grip the threads on its bolt and become locked on the bolt against unwanted loosening. If the elasticity of the material of the nut is selected so that in the formation of the nut the elasticity limit is not exceeded, the nut may be used several times.

The amount or strength of the locking effect may be predetermined by selecting the axial length or height of the annular projection on the working face of the nut, other conditions being equal. As an example, it has been determined that a projection protruding about $\frac{1}{100}$ of the diameter of the bolt on which the nut is threaded, produces sufficient reduction of the screw thread clearance among the threads near the working face of the nut to produce effective locking of the nut on the bolt.

Figure 6:
Figure 6 is a transverse section taken through a modified form of the nut involving a single relatively dense insert secured in a socket in the lower end of the nut, the insert and the nut having coinciding threaded bores.

As shown in Figure 6, the alteration of the modulus of elasticity of the nut bore area may be achieved to attain the locking effect, by using inserts of suitable form and material in the bores of the nuts. In Figure 6 the nut body $b$ and the insert $a$ are connected by fine screw threads.

Figure 7:
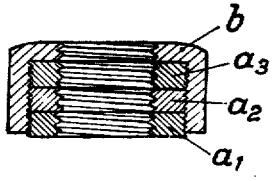
Figure 7 is a transverse section taken through a modified form of nut comprising a plurality of progressively dense inserts secured in a socket in the lower end of the nut, the nut and the inserts having coinciding threaded bores.

Further in accordance with the invention, as shown in Figure 7, the inserts may be composed of several parts $a_1$, $a_2$, $a_3$ possessing differing strengths and elasticities, which are secured in an accommodating portion of the bore of the nut in such a way that the strength and modulus of elasticity of the threaded bore of the nut increases from the bearing or working face of the nut toward the outer end of the nut.

Instead of securing the insert or inserts in the nut body by means of fine screw threading, other suitable means may be employed, such as welding, pressing, injecting, especially in the cases of nut bodies made partly or wholly of light metal.

Besides metallic parts, non-metallic parts may be used in building up the nut, especially the bore parts which produce the self-locking effect.

I claim:

1. A nut of the type described comprising a nut body composed of relatively elastic material and in which the threaded bore extends substantially entirely through the nut from the working face of the body to th outer end of the nut and in which an annular portion is formed on said working face surrounding the inner end of the threaded bore to project axially beyond the working face of the nut, the surface of the threaded bore being progressively hardened to a greater radial depth toward the outer end of the nut from the region of the inner end of the nut body whereby on being screwed home on a bolt and against the work to be clamped, the forcible engagement of said annular portion with the work distributes the resultant stresses along the threaded bore toward the outer end of the nut and the threads of the bore are compressed on the threads of the bolt at the inner end of the nut so as to lock the nut on the bolt.

2. A nut of the type described in claim 1, wherein said annular portion comprises an insert having a similarly threaded opening coinciding with the threaded bore of the nut body.

3. A nut of the type described in claim 1, wherein said annular portion comprises an insert having a similarly threaded opening coinciding with the threaded bore of the nut body, said insert being threaded in a threaded socket in the inner end of the nut body.

4. A nut of the type described in claim 1, wherein said annular portion comprises an insert having a similarly threaded opening coinciding with the threaded bore of the nut body, said insert being threaded in a threaded socket in the inner end of the nut body whose threads are substantially finer than those in the bore of the nut body.

5. A nut of the type described comprising a nut body composed of relatively elastic material and in which the threaded bore extends substantially entirely through the nut from the working face of the body to the outer end of the nut and in which an annular portion is formed on said working face surrounding the inner end of the threaded bore to project axially beyond the working face of the nut, the surface of the bore constructed to give a progressively greater modulus of elasticity toward the outer end of the nut from the region of the inner end of the nut body whereby on being screwed home on a bolt and against the work to be clamped, the forcible engagement of said annular portion with the work distributes the resultant stresses along the threaded bore toward the outer end of the nut and the threads of the bore are compressed on the threads of the bore at the inner end of the nut so as to lock the nut on the bolt.

6. A nut of the type described in claim 5, wherein said portions comprise a plurality of inserts secured in a socket formed in the inner end of the nut body, the final insert projecting from the working face of the nut body and all of the inserts being formed with coinciding threaded openings coinciding in turn with the threaded bore of the nut body, said inserts being in intimate contact and increasing in density from the inner end of the nut body toward the outer end thereof.

PAUL SCHÜTTLER.